United States Patent Office 3,391,153
Patented July 2, 1968

1

3,391,153
3 - NITRO - 2 - OXO - TETRAHYDROIMIDAZOLES 1 - SUBSTITUTED BY A 5 - NITRO - 2 - THIA-ZOLYL GROUP
Konrad Meier, Riehen, and Walter Fuhrer, Zurich, Switzerland, assignors to Ciba Corporation, New York, N.Y., a corporation of Delaware
No Drawing. Filed Jan. 3, 1966, Ser. No. 517,986
Claims priority, application Switzerland, Jan. 20, 1965, 766/65; June 16, 1965, 8,420/65
3 Claims. (Cl. 260—306.8)

ABSTRACT OF THE DISCLOSURE 3-nitro-2-oxo-tetrahydroimidazoles 1-substituted by a 5-nitro-2-thiazolyl group. These compounds may be further substituted, more especially, they may contain on the carbon atoms of the two heterocycles, above all in position 4 of the thiazole ring, e.g. lower aliphatic hydrocarbon radicals or aryl radicals, and these aryl radicals may themselves be substituted, e.g. by halogen atoms, such as chlorine or bromine, by the pseudo-halogen trifluoromethyl, by lower alkyl radicals, such as methyl or ethyl, by lower alkoxy groups, such as methoxy or ethoxy, by methylenedioxy or by nitro groups. The compounds are effective against parasites and bacteria.

The present invention provides a process for the manufacture of 3-nitro-2-oxo-tetrahydroimidazoles carrying in position 1 a 5-nitro-2-thiazolyl group.

These compounds may be further substituted; more especially they may contain on the carbon atoms of the two heterocycles, above all in position 4 of the thiazole ring e.g. lower aliphatic hydrocarbon radicals or aryl radicals, and these aryl radicals may themselves be substituted e.g. by halogen atoms such as chlorine or bromine, by the pseudo-halogen trifluoromethyl, by lower alkyl radicals, such as methyl or ethyl, by lower alkoxy groups such as methoxy or, ethoxy, by methylenedioxy or by nitro groups.

Particularly suitable lower aliphatic hydrocarbon radicals are lower alkyls such as methyl, ethyl, propyl, isopropyl, butyl, isobutyl or pentyl groups, also lower alkenyl such as allyl or methallyl radicals. The aryl radicals are above all phenyl groups.

The new compounds possess valuable pharmacological, especially antiparasitary and antibacterial properties. They act especially against protozoae and worms, and are, e.g. in infected animals, for example in mice, active against Gramnegative bacteria e.g. *Salmonella typhi* or coli bacilli, such as *Escherichia coli*. As has been observed in tests on e.g. hamsters the new compounds act against trichomonades and amoebae and e.g. in mice and sheep, against schistosomes. They also act against coccidiae. The new compounds are, therefore, useful as antiparasitary and antibacterial agents; they are especially suitable for the treatment of diseases caused by the pathogens mentioned.

The new compounds are also valuable intermediates for the manufacture of other useful substances. Inter alia, they can be converted by acid hydrolysis, e.g. by treatment with a dilute acid such as dilute sulfuric acid into the corresponding 2-oxo-tetrahydroimidazoles containing in position 1 a 5-nitro-2-thiazolyl radical; the latter products likewise possess pronounced antiparasitary and antibacterial properties.

2

Of special value is the 3-nitro-1-(5-nitro-2-thiazolyl)-2-oxo-tetrahydroimidazole of the formula

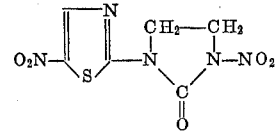

The new compounds can be manufactured e.g. by nitrating a 2-oxo-3-X-tetrahydroimidazole that contains in position 1 a 5-Y-thiazolyl-(2) radical, wherein one of the groups X or Y is a hydrogen atom and the other is a hydrogen atom or a nitro group, with fuming nitric acid under non-hydrolyzing conditions.

The above reaction, in which the starting material used is preferably a 2-oxo-tetrahydroimidazole that contains in position 1 a 5-Y-2-thiazolyl radical, Y representing a hydrogen atom or a nitro group, especially a 1-(5-Y-2-thiazolyl)-2-oxo-tetrahydroimidazole, is performed, for example, by treatment with fuming nitric acid of 96% strength, preferably in the presence of concentrated sulfuric acid, using the stoichiometric amount of fuming nitric acid needed for the introduction of the desired nitro groups, or an excess of this acid. In general, the reaction is performed at room temperature or with cooling.

The invention includes also any modification of the process in which an intermediate obtained at any stage of the process is used as starting material and any remaining step/steps is/are carried out, or in which the starting materials are formed in situ or are used in the form of their salts, as well as the new starting materials.

Thus, for example, starting from a 2-oxo-3-X-tetrahydroimidazole which contains in position 1 a 5-Y-2-thiazolyl radical, X and Y representing hydrogen atoms, the corresponding compounds may be obtained as intermediates, in which X is a nitro group, and these compounds may then be used as starting materials as indicated.

The 2 - oxo - 3-X-tetrahydroimidazoles used as starting materials, which contain in position 1 a 5-Y-2-thiazolyl radical, which X and Y have the above meanings, are obtained, for example, by reacting a 5-Y-2-aminothiazole, in which Y is a hydrogen atom or a nitro group, with a halogenoethyl isocyanate, whereupon the resulting N'-halogenoethyl-N-(5-Y-2-thiazolyl) - urea which contains on the N-nitrogen atom a hydrogen atom, is converted by cyclization, e.g. by treatment with a base such as a sodium hydroxide solution, into the 3-unsubstituted 2-oxo-tetrahydroimidazole, which contains in position 1 a 5-Y-2-thiazolyl radical. A resulting compound in which Y is a hydrogen atom can be converted by treatment with an equivalent amount of fuming nitric acid under non-hydrolyzing conditions into a 3-nitro-2-oxo-tetrahydroimidazole containing a 5-unsubstituted 2-thiazolyl radical.

The 3-nitro-2-oxo-tetrahydroimidazoles used as starting materials, which contain in position 1 a 5-unsubstituted thiazolyl-(2) radical, especially 3-nitro-2-oxo-1-(2-thiazolyl)-tetrahydroimidazole, are new and are likewise included in the present process.

It is advantageous to use starting materials that yield the final product indicated above as being particularly valuable.

The new compounds are suitable for use as medicaments e.g. in the form of pharmaceutical preparations containing them in admixture or conjunction with an organic or inorganic, solid or liquid pharmaceutical excipient suitable for enteral, parenteral or local administration. Suitable excipients are substances that do not react with the new compounds, e.g. water, gelatin, lactose, starches, magnesium stearate, talcum, vegetable oils, benzyl alcohols, gums, polyalkyleneglycols, white petroleum jelly, or other known medicinal excipients. The pharmaceutical preparations may be, for example, tablets, dragees, ointments or creams, or in liquid form solutions, suspensions or emulsions. They may be sterilized and/or may contain auxiliaries, such as preserving, stabilizing, wetting or emulsifying agents, salts for regulating the osmotic pressure or buffers. They may also contain other therapeutically valuable substances.

The above-mentioned products may also be used in conjunction with usual animal fodders or vehicles in the form of veterinary preparations or as fodders or additives to fodders in animal husbandry.

The following examples illustrate the invention.

Example 1

A solution of 34 g. of 1-(2-thiazolyl)-2-oxo-tetrahydroimidazole in 160 ml. of concentrated sulfuric acid of 96% strength is prepared at 60 to 70° C., cooled to −10° C. and within 30 minutes 17.9 ml. of fuming nitric acid of 96% strength are dropped in. The reaction mixture is stirred on for one hour at room temperature and then stirred over 1 kg. of ice. After standing for 1 hour, the resulting 3-nitro-1-(5-nitro-2-thiazolyl)-2-oxo-tetrahydroimidazole is filtered off and dried at 90° C. under vacuum; the white to light-yellow product decomposes at 228 to 230° C.

The starting material is prepared in the following manner:

A solution of 100 g. (1 mol) of 2-aminothiazole in 600 ml. of acetone is cooled to 8–10° C. and while being stirred mixed dropwise within 4 hours with 105 g. (1 mol) of chloroethyl isocyanate. During this addition the batch is kept at room temperature and then heated, with 300 ml. of acetone being distilled off. 530 ml. of 2 N-sodium hydroxide solution are then added, whereupon the product dissolves temporarily. The reaction mixture is heated and the distillative removal of acetone is continued until a boiling temperature of 80° C. has been reached. The batch is allowed to cool to room temperature, stirred overnight, and the precipitate is then filtered off. The resulting 1-(2-thiazolyl)-2-oxo-tetrahydroimidazole is washed with water and acetone and dried at 80° C. under vacuum; it melts at 212–214° C. Yield: 116 g. The products can be purified by being dissolved e.g. in 2 N-hydrochloric acid, the solution being treated with active carbon and the filtrate neutralized by stirring with 5 N-sodium hydroxide solution.

Example 2

A solution of 21.5 g. of 1-(5-nitro-2-thiazolyl)-2-oxo-tetrahydroimidazole in 55 ml. of concentrated sulfuric acid of 96% strength is prepared at 20–25° C., cooled to −7° C., and within 10 minutes 4.4 ml. of concentrated nitric acid of 96% strength are added. The reaction mixture is stirred for another 1½ hours at 22° C. and then poured over 400 g. of ice and 50 ml. of water with ice cooling. After 30 minutes' standing, the resulting 3 - nitro - 1 - (5 - nitro - 2 - thiazolyl) - 2 - oxo-tetrahydroimidazole is filtered off, washed neutral with cold water and dried at 60 °C. under vacuum. The crude product is recrystallized from boiling pyridine or dimethylformamide.

The starting material is prepared thus:

A solution of 25 g. of 2-amino-5-nitrothiazole and 50 g. of 2-chloroethyl isocyanate in 250 ml. of tetrahydrofuran is heated in a closed vessel for 16 hours at 80–90° C. After cooling, 150 ml. of tetrahydrofuran are evaporated, the precipitate is suctioned off and thoroughly washed with warm isopropyl ether, to yield N-(2-chloroethyl)-N'-(5-nitro-2-thiazolyl)-urea in crystals melting at 140° C. with decomposition.

A mixture of 25 g. of N-(2-chloroethyl)-N'-(5-nitro-2-thiazolyl)-urea and 1 liter of water is boiled with stirring for 7 hours. The precipitate is then filtered off and recrystallized from dimethylformamide+methanol, to yield 1-(5-nitro-2-thiazolyl)-2-oxo-tetrahydroimidazole in yellow crystals melting at 259–260° C.

Example 3

42.8 grams (0.2 mol) of 1-(2-thiazolyl)-2-oxo-3-nitro-tetrahydroimidazole are dissolved in 200 ml. of concentrated sulfuric acid of 96% strength, whereby the mixture is caused to heat up slightly; it is then cooled to −10 °C. and mixed within 30 minutes dropwise with 1.52 ml. (0.21 mol) of concentrated nitric acid of 63% strength. The reaction mixture is stirred for another hour at room temperature and then stirred over 1 kg. of ice. After standing for one hour the resulting 1-(5-nitro-2-thiazolyl)-2-oxo-3-nitro-tetrahydroimidazole is filtered off and dried at 90° C. under vacuum. The crude product can be purified by recrystallization from dimethylformamide; it decomposes at 238–240° C. (corrected).

The starting material can be prepared thus:

A solution of 34 g. (0.2 mol) of 1-(2-thiazolyl)-2-oxo-tetrahydroimidazole in 160 ml. of concentrated sulfuric acid of 96% strength is prepared at 60–70° C., then cooled to −10° C., and within 30 minutes 15.2 ml. (0.21 mol) of concentrated nitric acid of 63% strength are dropped in. The reaction mixture is stirred for another hour at room temperature and then stirred over 1 kg. of ice. After standing for one hour, the resulting 1-(2-thiazolyl)-2-oxo-3-nitro-tetrahydroimidazole is filtered off and dried at 90° C. under vacuum. The crude product can be purified by recrystallization from dimethylformamide; it decomposes at 224° C.

Example 4

A suspension prepared at room temperature from 52 g. of 3-nitro-1-(5-nitro-2-thiazolyl)-2-oxo-tetrahydroimidazole in ½ liter of a 1:1-mixture of concentrated sulfuric acid and water is caused to reflux by being slowly heated to the boil. When all of the starting material has dissolved, the reaction mixture is cooled to room temperature and diluted with 1 liter of water. After standing for one hour, the desired 1-(5-nitro-2-thiazolyl)-2-oxo-tetrahydroimidazole is filtered off, washed with water until it is free from acid and then dried at 90° C. under vacuum; it melts at 260–261° C.

Example 5

Tablets, each containing 0.5 g. of 3-nitro-1-(5-nitro-2-thiazolyl)-2-oxo-tetrahydroimidazole, can be prepared from the following ingredients:

| | Grams |
|---|---|
| 3-nitro-1-(5-nitro-2-thiazolyl)-2 - oxo - tetrahydroimidazole | 0.5 |
| Wheat starch | 0.04 |
| Colloidal silica with hydrolyzed starch | 0.03 |
| Arrowroot | 0.03 |
| Magnesium stearate | 0.006 |
| Talcum | 0.019 |
| | 0.625 |

Half the wheat starch is pasted with 4 times the amount of water on a water bath. A homogeneous mixture is prepared of the 3-nitro-1-(5-nitro-2-thiazolyl)-2-oxo-tetrahydroimidazole and the remainder of the starch, and the paste and sufficient water are then incorporated by kneading so that a plastic mass forms. The colloidal silica with hydrolyzed starch is then incorporated in portions.

The plastic mass is pressed through a 4–5 mm. mesh sieve and dried at 45° C. The dried granulate is passed through a sieve of 0.8 to 1.4 mm. mesh, and the remaining disintegrating and lubricating agents are added. After another homogenizing operation tablets of 11.5 mm. diameter and 0.625 g. weight are pressed in the usual manner.

What is claimed is:
1. Compounds of the formula

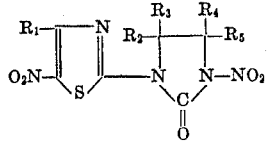

in which $R_1$ is a member selected from the group consisting of hydrogen and lower alkyl, and each of $R_2$, $R_3$, $R_4$ and $R_5$ is hydrogen.

2. A compound as claimed in claim 1, said compound being 3-nitro-1-(5-nitro-2-thiazolyl)-2-oxo-tetrahydro-imidazole.

3. The compound 3-nitro-1-(2-thiazolyl)-2-oxo-tetrahydro-imidazole.

References Cited

FOREIGN PATENTS 6,410,031   3/1965   Netherlands.

NICHOLAS S. RIZZO, *Primary Examiner.*

ALEX MAZEL, *Examiner.*

R. GALLAGHER, *Assistant Examiner.*